(12) United States Patent
Kozin et al.

(10) Patent No.: US 12,035,160 B1
(45) Date of Patent: Jul. 9, 2024

(54) PROCESSING CHANNEL STATE INFORMATION (CSI) TO DETERMINE CHARACTERISTICS OF A SPACE BETWEEN WIRELESS ACCESS POINTS

(71) Applicant: Juniper Networks, Inc., Sunnyvale, CA (US)

(72) Inventors: Vladimir Vladimirovich Kozin, Livermore, CA (US); Scott Morgan Bowers, Mountain View, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 221 days.

(21) Appl. No.: 17/644,280

(22) Filed: Dec. 14, 2021

Related U.S. Application Data

(60) Provisional application No. 63/243,497, filed on Sep. 13, 2021.

(51) Int. Cl.
| | |
|---|---|
| *H04J 1/16* | (2006.01) |
| *H04W 24/08* | (2009.01) |
| *H04W 84/12* | (2009.01) |

(52) U.S. Cl.
CPC ............ *H04W 24/08* (2013.01); *H04W 84/12* (2013.01)

(58) Field of Classification Search
CPC ............... H04W 24/08; H04W 84/12
USPC .......................................................... 370/252
See application file for complete search history.

(56) References Cited

U.S. PATENT DOCUMENTS

| 11,688,263 B2* | 6/2023 | Shin ........................ H04W 4/50 340/573.1 |
| --- | --- | --- |
| 2019/0123938 A1* | 4/2019 | Min ..................... H04B 17/318 |
| 2019/0349046 A1* | 11/2019 | Liu ........................ H04B 7/0626 |
| 2019/0349715 A1* | 11/2019 | Ghourchian .......... G01S 7/4021 |
| 2021/0298108 A1* | 9/2021 | Wu ..................... H04W 74/0833 |
| 2022/0044042 A1* | 2/2022 | Kefayati ................. G06V 20/46 |
| 2022/0053295 A1* | 2/2022 | Ghourchian .......... H04W 4/029 |
| 2022/0070633 A1* | 3/2022 | Ghoshal ................ H04W 4/023 |

(Continued)

OTHER PUBLICATIONS

Da Silva et al., "WiDMove: Sensing Movement Direction Using IEEE 802.11n Interfaces," 2018 IEEE Canadian Conference on Electrical & Computer Engineering (CCECE), May 13-16, 2018, Quebec, QC, Canada, 4 pp.

(Continued)

*Primary Examiner* — Chuong T Ho
(74) *Attorney, Agent, or Firm* — Shumaker & Sieffert, P.A.

(57) ABSTRACT

A computing system includes a storage device and processing circuitry having access to the storage device. The processing circuitry is configured to receive a sequence of channel state information (CSI) samples, and calculate, based on the sequence of CSI samples, frequency domain information including a set of frequency domain values for each frequency band of a plurality of frequency bands. The processing circuitry is further configured to select a set of frequency bands of the plurality of frequency bands; and calculate, based on the set of frequency domain values for each frequency band of the set of frequency bands, a set of similarity values. Additionally, the processing circuitry is configured to determine, based on the set of similarity values, information indicative of one or more characteristics of a space between a first computing device and a second computing device, and perform an action based on the information.

20 Claims, 6 Drawing Sheets

(56) References Cited

U.S. PATENT DOCUMENTS

| | | | |
|---|---|---|---|
| 2022/0369210 A1* | 11/2022 | Omer | H04W 4/38 |
| 2022/0416866 A1* | 12/2022 | Ge | H04B 7/0482 |
| 2023/0209322 A1* | 6/2023 | Shrivastava | H04W 4/90 |
| | | | 455/404.2 |
| 2023/0247455 A1* | 8/2023 | Beg | G01S 7/006 |
| | | | 370/252 |

OTHER PUBLICATIONS

Xi et al., "Electronic Frog Eye: Counting Crowd Using WiFi," IEEE INFOCOM 2014—IEEE Conference on Computer Communications, Apr. 27-May 2, 2014, Toronto, ON, Canada, 9 pp.

Yang et al., "Device-Free Occupant Activity Sensing Using WiFi-Enabled IoT Devices for Smart Homes," IEEE Internet of Things Journal, Jun. 2018, 12 pp.

* cited by examiner

PROCESSING CHANNEL STATE INFORMATION (CSI) TO DETERMINE CHARACTERISTICS OF A SPACE BETWEEN WIRELESS ACCESS POINTS

This application claims the benefit of U.S. Provisional Patent Application No. 63/243,497, filed on Sep. 13, 2021, the entire content of which is incorporated herein by reference.

TECHNICAL FIELD

This disclosure relates to computer networks, and more specifically, to access points of computer networks.

BACKGROUND

A computer network is a collection of interconnected computing devices that can exchange data and share resources. In a packet-based network, such as an Ethernet network, the computing devices communicate data by dividing the data into variable-length blocks called packets, which are individually routed across the network from a source device to a destination device. The packets are transmitted between the source device and destination device using intermediate network devices, such as access points, gateways, firewalls, switches, and routers. The destination device extracts the data from the packets and assembles the data into its original form.

In some examples, a source device, such as a wireless device, connects to an access point (otherwise referred to as "wireless access point") to connect to a wired computer network, such as an enterprise network, branch network, service provider network, home network, virtual private network (VPN), local area network (LAN), virtual LAN (VLAN), and the like. For example, the access point may receive application traffic from source devices and tunnel (e.g., using Generic Routing Encapsulation (GRE)) the application traffic to a gateway device of the enterprise network, which in turn sends the application traffic to the destination device, such as an application server.

SUMMARY

This disclosure describes techniques for processing channel state information (CSI) corresponding to a communication channel between two wireless access points. For example, a system may calculate frequency domain information based on a sequence of CSI samples and calculate one or more similarity measures for the frequency domain information. These similarity measures may indicate one or more characteristics of a space between the two wireless access points. For instance, the communication channel may connect a first wireless access point and a second wireless access point. The second wireless access point may generate the sequence of CSI samples based on receiving Wi-Fi signals from the first wireless access point. The similarity measures may indicate whether movement is occurring in the space between the first wireless access point and the second wireless access point.

In accordance with the described techniques, a CSI sample may include a set of CSI values. These CSI values may represent complex numbers each having a quadrature (Q) and in-phase (I) value. In some examples, each CSI sample of the sequence of CSI samples may include the same number n of CSI values (e.g., 56 CSI values). In other words, each CSI sample may include a $1^{st}$ CSI value, a $2^{nd}$ CSI value, through an $n^{th}$ CSI value. The second wireless access point may generate the sequence of CSI samples based on receiving Wi-Fi signals from the first wireless access point. Based on generating the sequence of CSI samples, the system may calculate frequency domain information. This frequency domain information may include a set of frequency domain information for each of the n CSI values. As one example, the system may calculate a first set of frequency domain information corresponding to a first sequence of CSI values including the $1^{st}$ CSI value of each CSI sample, the system may calculate a second set of frequency domain information corresponding to a second sequence of CSI values including the $2^{nd}$ CSI value of each CSI sample, and so on. Each set of frequency domain information may be determined using a fast Fourier transform (FFT) algorithm, but this is not required. The sets of frequency domain information may be determined using any kind of algorithm that determines frequency domain information.

The techniques described in this disclosure may provide one or more technical advantages that realize at least one practical application. For example, the system may analyze the frequency domain information in order to determine one or more characteristics of the space between the first wireless access point and the second wireless access point. Movement between the first access point and the second access point may affect the sequence of CSI samples generated by the second access point based on Wi-Fi signals received from the first access point. Movement by one or more people or objects in the space between the first access point and the second access point may introduce variation in a multipath pattern between the two access points or otherwise introduce noise into the CSI samples. Variations in the multipath pattern and other noise may be detectable in similarity measures of the frequency domain information calculated by the system. The system may, in some examples, execute a supervised machine learning model, where the similarity measures of the frequency domain information represent inputs to the machine learning model. The supervised machine learning model may output information indicative of one or more characteristics of the space between the first access point and the second access point. By determining the similarity measures for the frequency domain information, the system may better identify characteristics of the space between two wireless access points as compared with systems that do not compute similarity measures based on frequency domain information of CSI samples.

In one example, this disclosure describes a computing system comprising a storage device; and processing circuitry having access to the storage device. The processing circuitry is configured to receive a sequence of channel state information (CSI) samples, wherein the sequence of channel state information (CSI) samples correspond to a communication channel between a first computing device and a second computing device; calculate, based on the sequence of CSI samples, frequency domain information including a set of frequency domain values for each frequency band of a plurality of frequency bands; and select a set of frequency bands of the plurality of frequency bands. The processing circuitry is further configured to calculate, based on the set of frequency domain values for each frequency band of the set of frequency bands, a set of similarity values, wherein each similarity value of the set of similarity values corresponds to the set of frequency domain values for the respective frequency band of the set of frequency bands; determine, based on the set of similarity values, information indicative of one or more characteristics of a space between the first computing device and the second computing device; and perform an action based on the information.

In another example, this disclosure describes a method comprising receiving, by processing circuitry having access to a storage device, a sequence of channel state information (CSI) samples, wherein the sequence of channel state information (CSI) samples correspond to a communication channel between a first computing device and a second computing device; calculating, by the processing circuitry based on the sequence of CSI samples, frequency domain information including a set of frequency domain values for each frequency band of a plurality of frequency bands; and selecting, by the processing circuitry, a set of frequency bands of the plurality of frequency bands. Additionally, the method includes calculating, by the processing circuitry based on the set of frequency domain values for each frequency band of the set of frequency bands, a set of similarity values, wherein each similarity value of the set of similarity values corresponds to the set of frequency domain values for the respective frequency band of the set of frequency bands; determining, by the processing circuitry based on the set of similarity values, information indicative of one or more characteristics of a space between the first computing device and the second computing device; and performing, by the processing circuitry, an action based on the information.

In another example, this disclosure describes a computer-readable medium comprising instructions that, when executed by a processor, causes the processor to receive a sequence of channel state information (CSI) samples, wherein the sequence of channel state information (CSI) samples correspond to a communication channel between a first computing device and a second computing device; calculate, based on the sequence of CSI samples, frequency domain information including a set of frequency domain values for each frequency band of a plurality of frequency bands; and select a set of frequency bands of the plurality of frequency bands. Additionally, the instructions cause the processor to calculate, based on the set of frequency domain values for each frequency band of the set of frequency bands, a set of similarity values, wherein each similarity value of the set of similarity values corresponds to the set of frequency domain values for the respective frequency band of the set of frequency bands; determine, based on the set of similarity values, information indicative of one or more characteristics of a space between the first computing device and the second computing device; and perform an action based on the information.

The details of one or more examples are set forth in the accompanying drawings and the description below. Other features, objects, and advantages will be apparent from the description and drawings, and from the claims.

DETAILED DESCRIPTION

Figure 1:
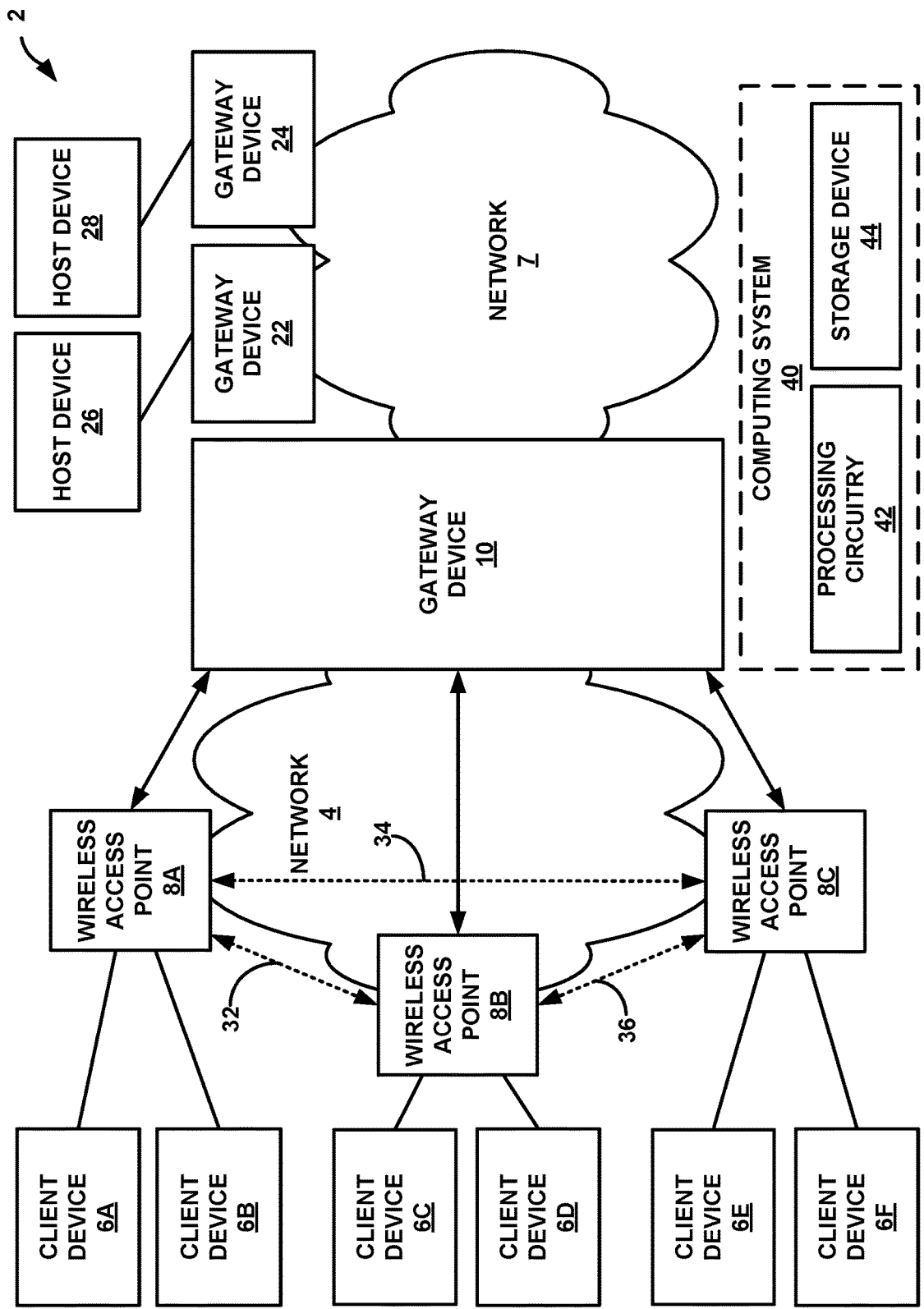
FIG. 1 is a block diagram illustrating an example network system that determines characteristics of a space between wireless access points, in accordance with one or more techniques of this disclosure.

FIG. 1 is a block diagram illustrating an example network system 2 that determines characteristics of a space between wireless access points 8, in accordance with one or more techniques of this disclosure. In particular, FIG. 1 illustrates one example implementation of a network system 2 that includes a network 4 that includes client devices 6A-6F (collectively, "client devices 6") with access to network 7 via wireless access points 8A-8C (collectively, "wireless access points 8") and/or gateway device 10. Client devices 6A and 6B connect to wireless access point 8A, client devices 6C and 6D connect to wireless access point 8B, and client devices 6E and 6F connect to wireless access point 8C.

In the example of FIG. 1, network 4 may represent a Local Area Network (LAN) that connects client devices 6 within a building or a group of buildings to network 7 via wireless access points 8 and/or gateway device 10. In some examples, Network 7 may represent a public network such as the Internet, a private network, such as those owned and operated by an enterprise or service provider, or a combination of both public and private networks that provides packet-based network services to client devices 6. As a result, network 7 may alternatively be referred to herein as a Service Provider (SP) network. Network 7 may include one or more Wide Area Networks (WANs), LANs, an enterprise LAN, Virtual Local Area Networks (VLANs), Virtual Private Networks (VPNs), and/or another type of network. Network system 2 may, for example, comprise a software-defined wide area network (SD WAN) managed by one or more software-defined networking (SDN) controllers.

In some examples, client devices 6 may connect to gateway device 10 via network 4 to receive one or more services provided via network 7. For example, gateway device 22 and gateway device 24 may connect host device 26 and host device 28 to network 7. Client devices 6 may receive one or more services from host devices 26, 28 via network 7 and gateway device 10. Client devices 6 may be, for example, personal or laptop computers having, e.g., a wireless card, wireless-capable netbooks, mobile telephones, video game devices, smart phones, tablets, Internet of Things (IoT) devices, or other types of devices that access the services provided by host devices 26, 28. Each of client devices 6 may run a variety of software applications, such as word processing and other office support software, web browsing software, software to support voice calls, video games, videoconferencing, video streaming, and email, among others.

Wireless access points 8 may represent computing devices that connect with gateway device in order to provide wireless services to client devices 6. That is, wireless access points 8 may connect to client devices 6 via wireless connections. In some examples, wireless access points 8 may connect to gateway device 10 via wired connections. In some examples, wireless access points 8 may connect to gateway device 10 via wireless connections.

Gateway device 10 may be a router, firewall, or other network device to provide client devices 6 with access to services provided by host devices 26, 28 via network 7. Gateway device 10 redirects traffic flows to and from host devices 26, 28 that provide the services. For example, gateway device 10 may establish a communication session, e.g., a transmission control protocol (TCP) session, with one or both of host devices 26, 28. Gateway device 22 and gateway device 24 may be routers, firewalls, or other network devices to provide host devices 26, 28 with access network 7.

Client devices 6 may in some instances connect to wireless access points 8 to reach gateway device 10, which in turn accesses one or more services provided by host devices 26, 28. Wireless access points 8 may connect wireless network devices, e.g., client devices 6, to a wired network (e.g., enterprise network) by tunneling traffic to a gateway device 10. In other words, client devices 6 may, in the example of FIG. 1, connect to a remote server of an enterprise network via wireless access points 8 and gateway device 10.

Host devices 26, 28 may represent servers, databases, or other types of network devices that facilitate delivery of services via network 7. Although referred to as single devices, each of host devices 26, 28 may represent an ecosystem of one or more devices configured to provide a service, such as Voice over Internet Protocol (VoIP), streaming video, data analysis or analytics (for various purposes, including malware detection, virus detection, data mining, cryptography, etc.), machine learning, security—including authentication, authorization, and accounting (AAA), network address translation (NAT), encryption, decryption, or any other type of service capable of being provided via network 7.

Wireless access points 8 may form communication channels between one another. For example, a communication channel 32 may connect wireless access point 8A and wireless access point 8B, a communication channel 34 may connect wireless access point 8A and wireless access point 8C, and a communication channel 36 may connect wireless access point 8B and wireless access point 8C. Communication channels 32, 34, 36 may represent wireless communication channels. Since network 4 represents a LAN, wireless access points 8 may be located within the same general area (e.g., within the same building or group of buildings). Communication channels 32, 34, 36 may facilitate wireless access points 8 in providing wireless services to client devices 6.

In some examples, any one or combination of wireless access points 8 may generate channel state information (CSI) corresponding to one of communication channels 32, 34, 36. For example, wireless access point 8B may receive Wi-Fi signals from wireless access point 8A over communication channel 32. Wireless access point 8B may generate CSI that indicates one or more channel properties of communication channel 32. These channel properties may include levels of signal scattering, signal fading, and power decay over the respective communication channel 32. Channel properties of communication channel 32 may be affected by one or more people or objects in a space between wireless access point 8A and wireless access point 8B. For example, the presence of a thick wall between wireless access point 8A and wireless access point 8B may increase a power decay of the CSI over channel 32 as compared with a case where no walls or solid objects separate wireless access point 8A and access point 8B. Additionally, or alternatively, movement of one or more objects or people between wireless access point 8A and wireless access point 8B may affect the CSI generated by access point 8B based on Wi-Fi signals received over communication channel 32.

In some examples, each data packet travelling over communication channel 32 and arriving at wireless access point 8B may include a high throughput long training field (HT-LTF) and a very high throughput long training field (VHT-LTF). Wireless access point 8B may generate one or more CSI samples based on data contained within these packet fields. In some examples, wireless access point 8B may generate one or more CSI samples for each packet arriving at wireless access point 8B over the communication channel 32, but this is not required. In some examples, wireless access point 8B may generate one or more CSI samples according to a CSI sample time window (e.g., 10 milliseconds (ms) or 20 ms).

Techniques described herein may allow a system to analyze CSI in order to determine characteristics and properties of a space between two or more wireless access points. This information may allow the system to control one or more devices. For example, based on determining that a person is present in a space, the system may increase a bandwidth to one or more access points proximate to the person. This is just one example. The system may control one or more smart home devices or other devices based on information determined by analyzing CSI. The system may also perform one or more security actions based on detecting one or more intruders in the space between access points. For example, the system may detect movement in the space based on analysis of the CSI data, and perform any one or combination of activate one or more alarms or contact authorities.

Wireless access point 8B may generate a sequence of CSI samples in response to receiving Wi-Fi signals from wireless access point 8A over a period of time. For example, access point 8B may generate CSI samples according to a CSI sample frequency, where the CSI samples are separated by the same time interval. As an example, CSI samples of the sequence of CSI samples may be separated by a time interval (e.g., 10 ms or 20 ms). In some examples, each CSI sample may include a set of CSI values. These CSI values may represent complex numbers each having an amplitude value and a phase value. Each CSI value may include a magnitude based on the amplitude value and the phase value.

In some examples, each CSI sample of the sequence of CSI samples may include the same number n of CSI values (e.g., 56 CSI values). In other words, each CSI sample may include a $1^{st}$ CSI value, a $2^{nd}$ CSI value, through an $n^{th}$ CSI value. This means that the sequence of CSI samples includes a sequence of $1^{st}$ CSI values, a sequence of $2^{nd}$ CSI values, and so on. In one example, each CSI sample of the sequence of CSI samples may include 56 CSI values, but this is not required. A sequence of CSI samples may include any number of CSI samples. In some examples, the sequence of $1^{st}$ CSI values may represent a $1^{st}$ CSI value sequence, the sequence of $2^{nd}$ CSI values may represent a $2^{nd}$ CSI value sequence, and so on. In the example where each CSI sample includes 56 CSI values, the sequence of CSI samples may include 56 CSI value sequences.

In some examples, the number of CSI values in each CSI sample of the sequence of CSI samples may vary depending on a standard that wireless access points 8 use to transmit Wi-fi signals across communication channels 32, 34, 36. For example, when the wireless access points 8 use the Institute of Electrical and Electronics Engineers (IEEE) 802.11a standard or the IEEE 802.11g standard, each CSI sample may include up to 52 CSI values. When the wireless access points 8 use the IEEE 802.11n standard or the IEEE 802.11ac standard, each CSI sample may include up to 56 CSI values. When the wireless access points 8 use the 20 Megahertz (MHz) IEEE 802.11n standard or the 20 MHz IEEE 802.11ac standard, each CSI sample may include up to 56 CSI values. When the wireless access points 8 use the 40 MHz IEEE 802.11n standard or the 40 MHz IEEE 802.11ac standard, each CSI sample may include up to 114 CSI values. When the wireless access points 8 use the 40 MHz IEEE 802.11n standard or the 40 MHz IEEE 802.11ac standard, each CSI sample may include up to 114 CSI values. When the wireless access points 8 use the 80 MHz IEEE 802.11ac standard, each CSI sample may include up to 242 CSI values. When the wireless access points 8 use the 160 MHz IEEE 802.11ac standard, each CSI sample may include up to 484 CSI values.

Computing system 40 may include processing circuitry 42 and storage device 44. Computing system 40 may be configured to analyze CSI samples corresponding to any one or combination of communication channels 32, 34, 36 in order to identify one or more characteristics of these channels. This means that computing system 40 may process CSI samples to determine characteristics of a space between any two of wireless access points 8. Computing system 40 may, in some examples, be configured to combine information indicative of one or more characteristics of the space between wireless access point 8A and wireless access point 8B, information indicative of one or more characteristics of the space between wireless access point 8A and wireless access point 8C, and information indicative of one or more characteristics of the space between wireless access point 8B and wireless access point 8C. By combining this information, computing system 40 may identify more details as compared with systems that do not combine information from more than one communication channel.

In some examples, computing system 40 may be located within any one or combination of wireless access points 8, but this is not required. Computing system 40 may, in some examples, be located within one or more devices separate from wireless access points 8. In any case, computing system 40 may be configured to receive and process CSI received by any one or combination of wireless access points 8.

Processing circuitry 42 may include fixed function circuitry and/or programmable processing circuitry. Processing circuitry 42 may include any one or more of a microprocessor, a controller, a digital signal processor (DSP), an application specific integrated circuit (ASIC), a field-programmable gate array (FPGA), or equivalent discrete or analog logic circuitry. In some examples, processing circuitry 42 may include multiple components, such as any combination of one or more microprocessors, one or more controllers, one or more DSPs, one or more ASICs, or one or more FPGAs, as well as other discrete or integrated logic circuitry. The functions attributed to processing circuitry 42 herein may be embodied as software, firmware, hardware or any combination thereof.

Storage device 44 may be configured to store information within computing system 40 during operation. Storage device 44 may include a computer-readable storage medium or computer-readable storage device. In some examples, storage device 44 includes one or more of a short-term memory or a long-term memory. Storage device 44 may include, for example, random access memories (RAM), dynamic random access memories (DRAM), static random access memories (SRAM), magnetic discs, optical discs, flash memories, or forms of electrically programmable memories (EPROM) or electrically erasable and programmable memories (EEPROM). In some examples, storage device 44 is used to store data indicative of instructions for execution by processing circuitry 42.

In some examples, processing circuitry 42 is configured to receive a sequence of CSI samples corresponding to communication channel 32. In some cases, wireless access point 8B may generate the sequence of CSI samples based on signals received from wireless access point 8A, but this is not required. In some cases, wireless access point 8A may generate the sequence of CSI samples based on signals received from wireless access point 8B. In any case, the sequence of CSI samples may indicate one or more characteristics of the space between wireless access point 8A and wireless access point 8B, where the communication channel 32 spans the space between the wireless access point 8A and the wireless access point 8B.

The sequence of CSI samples may include a set of CSI value sequences. In one example, each CSI sample of the sequence of CSI samples may include n CSI values, and the sequence of CSI samples include m CSI samples. In this example, A $1^{st}$ CSI value sequence may include the $1^{st}$ CSI value of each CSI sample, a $2^{nd}$ CSI value sequence may include the $2^{nd}$ CSI value of each CSI sample, and an $n^{th}$ CSI value sequence may include the $n^{th}$ CSI value of each CSI sample. Furthermore, in this example, the set of CSI value sequences may include n CSI value sequences, and each CSI value sequence of the set of CSI value sequences may include m CSI samples. This means that the set of CSI value sequences may include m×n CSI samples.

Processing circuitry 42 may calculate, based on the sequence of CSI samples corresponding to communication channel 32, frequency domain information. The sequence of CSI samples may include time domain value sequences of CSI values. Processing circuitry 42 may execute one or more transform algorithms to convert this time domain data into frequency domain data. For example, Processing circuitry 42 may compute a set of discrete Fourier transforms (DFTs), each DFT of the set of DFTs corresponding to a CSI value sequence of the set of CSI value sequences. Processing circuitry 42 may compute, based on each CSI value sequence of the set of CSI value sequences, a respective DFT of the set of DFTs. In some examples, processing circuitry 42 executes a fast Fourier transform (FFT) algorithm (e.g., the Cooley-Tuckey FFT algorithm) to compute each DFT of the set of DFTs, but this is not required. Processing circuitry 42 may execute any kind of algorithm in order to compute the set of DFTs.

In some examples, each DFT of the set of DFTs may include a plurality of DFT values. Each DFT value of the plurality of DFT values may indicate a parameter of a respective frequency band of a plurality of frequency bands. In some examples, the parameter of a frequency band indicates a prevalence of the frequency band in the respective CSI value sequence corresponding to the DFT value. This means that each DFT of the set of DFTs may indicate the parameters of a plurality of frequency bands for the respective CSI value sequence of the set of CSI value sequences. Put another way, a DFT of the set of DFTs may include a plurality of y DFT values, wherein each DFT value of the plurality of y DFT values indicates a parameter of a respective frequency band of the plurality of y frequency bands. The set of DFTs includes a matrix of y×n DFT values, where each row of the matrix includes the plurality of DFT values for a respective DFT of the set of DFTs, and where each column of the matrix includes a set of DFT values corresponding to a respective frequency band of the plurality of y frequency bands. This means that each column of the matrix of DFT values indicates the parameter of the respective frequency band for each CSI value sequence of the set of n CSI value sequences. In some examples, the number of y frequency bands may be within a range from 200 to 2000 frequency bands, but this is not required. The plurality of frequency bands may include any number of frequency bands. In one example, the number of y frequency bands may be 1024. In one example, the number of y frequency bands may be 256.

As described herein, a "frequency band" may refer to a range of frequencies. For example, a frequency band may represent a range from a lower-bound frequency value to an upper-bound frequency value. A DFT value corresponding to a frequency band may indicate a level of prevalence of the respective range of frequencies in a CSI value sequence corresponding to the DFT value. For example, the CSI value sequence may include signals at one or more frequencies. If frequencies within a first frequency band are more prevalent in the CSI value sequence than frequencies within a second frequency band, then a first DFT value corresponding to the first frequency band is greater than a second DFT value corresponding to the second frequency band.

Processing circuitry 42 may select a set of frequency bands of the plurality of frequency bands for analyzing frequency domain information calculated based on the sequence of CSI samples. Since processing circuitry 42 analyzes the sequence of CSI samples to determine one or more characteristics of the space between wireless access point 8A and wireless access point 8B (e.g., movement in the space), it may be beneficial for processing circuitry 42 to select frequency bands that are most affected by movements in the space. Processing circuitry 42 may select the set of frequency bands to include low frequency bands. In some examples, each frequency band of the set of frequency bands may be in the lowest 50% or lowest 20% of the plurality of frequency bands. In one example, processing circuitry 42 may select the set of frequency bands to include the lowest frequency bands of the plurality of frequency bands. In one example, the plurality of frequency bands includes 1024 frequency bands, and processing circuitry 42 selects the lowest 200 frequency bands of the plurality of frequency bands as the set of frequency bands. By selecting the set of frequency bands to include low frequencies, processing circuitry 42 may increase a likelihood of correctly identifying one or more characteristics of the space between wireless access point 8A and wireless access point 8B as compared with systems that do not select low frequency bands for analysis. This is because people or objects moving in the space between wireless access point 8A and wireless access point 8B may affect the low frequency bands of CSI data more than people or objects moving in the space affect high frequency bands of the CSI data. Objects that move in fast, cyclical patterns (e.g., a rotating fan) may affect the high frequency bands of the CSI data more than Objects that move in fast, cyclical patterns affect the low frequency bands. Consequently, to determine information corresponding to the movement of people or objects, it may be beneficial to analyze the low frequency bands of the CSI data.

Processing circuitry 42 may determine levels of similarity in the frequency domain information for each frequency band of the set of frequency bands selected from the plurality of frequency bands. For example, the frequency domain information may include a set of DFT values for each frequency band of the set of frequency bands. The set DFT values for each frequency band of the set of frequency bands may include a DFT value indicating a parameter of the respective frequency band for each CSI value sequence of the set of CSI value sequences. When there is no movement or small amounts of movement by objects in the space between wireless access point 8A and wireless access point 8B during the period of time when wireless access point 8B generates the sequence of CSI samples based on signals travelling across communication channel 32, DFT values for each CSI value sequence of the set of CSI value sequences may be approximately the same for each frequency band of the set of frequency bands. When there is movement by objects in the space between wireless access point 8A and wireless access point 8B, at least one DFT value may be different than other DFT values corresponding to the same frequency band.

Processing circuitry 42 may calculate, based on the set of frequency domain values for each frequency band of the set of frequency bands, a set of similarity values. Each similarity value of the set of similarity values may correspond to the set of frequency domain values for the respective frequency band of the set of frequency bands. A similarity value may indicate a level of similarity between a set of DFT values. For example, a high similarity value may indicate that a set of DFT values are the same or nearly the same, and a low similarity value may indicate that at least one DFT value of a set of DFT values is different than one or more other DFT values of the set of DFT values. Each similarity value of the set of similarity values may include any one or combination of Euclidean similarities, cosine similarities, Minkowski similarities, and Jaccard similarities.

In some examples, processing circuitry 42 may determine information indicative of one or more characteristics of the space between wireless access point 8A and wireless access point 8B based on the set of similarity values calculated based on the frequency domain information for the sequence of CSI samples. In some examples, processing circuitry 42 may execute a supervised machine learning model, where the set of similarity values represent inputs to the machine learning model. The supervised machine learning model may output information indicative of one or more characteristics of the space between wireless access point 8A and wireless access point 8B. Processing circuitry 42 may train the machine learning model based on a set of training data. The set of training data may include a plurality of sets of training similarity values, where each set of training similarity values of the plurality of sets of training similarity values are associated with a set of known characteristics (e.g., known movements of objects). These associations of known characteristics with similarity values may allow the machine learning model to determine one or more characteristics indicated by the set of similarity values for communication channel 32. Although processing circuitry 42 executes a supervised machine learning model in some examples, this is not required. Processing circuitry 42 may determine the information indicative of one or more characteristics of the space between wireless access point 8A and wireless access point 8B using one or more other models or algorithms (e.g., linear regression models).

Processing circuitry 42 may perform one or more actions based on the information indicative of one or more characteristics of the space between wireless access point 8A and wireless access point 8B. For example, processing circuitry 42 may output the information, processing circuitry 42 may control one or more devices based on the information, processing circuitry may store the information in storage device 44, or any combination thereof. In some examples, processing circuitry 42 may perform one or more security actions based on the information. For example, the information may indicate that one or more intruders are present in the space between wireless access point 8A and wireless access point 8B. Processing circuitry 42 may activate one or more alarms, contact authorities, and/or perform other security actions based on detecting intruders.

Although the techniques are described with respect to the space between wireless access point 8A and wireless access point 8B, the techniques described herein may be used to determine one or more characteristics of a space between any two access points. For example, processing circuitry 42 may be configured to determine one or more characteristics of the space between wireless access point 8A and wireless access point 8C based on a sequence of CSI samples corresponding to communication channel 34, and processing circuitry 42 may be configured to determine one or more characteristics of the space between wireless access point 8B and wireless access point 8C based on a sequence of CSI samples corresponding to communication channel 36. The techniques described herein are not meant to be limited to systems with three wireless access points. Network system 2 may, in some cases, include more than three wireless access points or less than three wireless access points.

In some examples, computing system 40 may analyze Wi-Fi signals transmitted from a wireless access point and received by another wireless access point to determine whether object movement is occurring in a space covered be a Wi-Fi network during the time that the Wi-Fi signals are transmitted. Wi-Fi signals may cause one or more access points to generate CSI samples. Computing system 40 may use CSI data to generate a model of the frequency response of the space between access points, and computing system 40 may determine whether someone is moving in the Wi-Fi coverage area based on changes detected in the frequency domain of the CSI samples. In some examples, a chipset of a receiver wireless access point (e.g., wireless access point 8B) produces CSI samples based on a Wi-Fi signal received from a transmitting access point (e.g., wireless access point 8A). The CSI samples may indicate a frequency response of a radio frequency (RF) propagation channel between wireless access point 8A and wireless access point 8B. Additionally, or alternatively, CSI samples may reflect properties of antennas, amplifiers, and a space between the transmitting and receiving access points within a frequency band of a selected Wi-Fi channel.

In some examples, a single CSI sample may represent a set of complex numbers, which represent a value sequence of amplitudes and phases of the received Wi-Fi signal. Computing system 40 may convert these complex numbers into amplitudes and phases. In some examples, the phase is ignored and only the amplitude is used, but this is not required. In some examples, computing system 40 may analyze both of the amplitude and the phase. Changes in propagation conditions over a communication channel between the access points may result in changes across a sequence of CSI samples. In accordance with one specific implementation, the communication channel between wireless access point 8A and wireless access point 8B comprises an 80 megahertz (MHz) channel. In some examples, a CSI sample may include 56 complex numbers. As discussed above, the CSI sample of 56 complex numbers may be converted into vector of 56 real numbers corresponding to the 56 amplitudes of the complex numbers.

In some examples, devices may transmit data using multiple-input multiple-output (MIMO) technology in order to increase an amount of data that two devices can exchange over a period of time as compared with devices that only use one transmit (TX) antenna and one receive (RX) antenna. When a transmitting device and/or a receiving device comprises more than one antenna communicating Wi-Fi data, the receiving device may generate a CSI sample for each unique pair of RX and TX antennas. For example, when a transmitting access point includes two TX antennas and a receiving access point comprises three RX antennas, the receiving access point may generate six CSI samples, one CSI sample per RX/TX antenna combination. In this example, each CSI sample of the sequence of CSI samples generated by the receiving device may comprise six vectors of CSI values generated substantially simultaneously. The receiving device may transmit the generated CSI samples to computing system 40, and computing system 40 may store the CSI samples in a CSI sample table in storage device 44.

In some examples, computing system 40 may measure CSI for each path twice (e.g., once in each direction). In some examples, computing system 40 may receive CSI measurements for each packet transmitted between access points. In some examples, a receiving wireless access point may generate CSI samples according to a time interval within a range from 10 ms to 100 ms. In some examples, a receiving wireless access point may generate a CSI sample every 10 ms according to a 1.5-second sliding window. In some examples, a receiving wireless access point may generate a CSI sample every 20 ms according to a 3-second sliding window. CSI samples may form a time series of complex numbers which are converted into a time-series of real numbers representative of the time dependent amplitudes of the corresponding CSI elements.

When a frequency response of a space between the transmitting and receiving access points does not change, the CSI samples may remain substantially constant. When one or more objects move within the Wi-Fi coverage area, the frequency domain of a sequence of CSI samples may change during the period of time that the receiving access point generates the CSI samples based on receiving Wi-Fi signals. For example, one or more elements of the CSI value sequence may change over time. Computing system 40 may analyze a frequency domain of the sequence of CSI samples in order to identify the changes in the sequence of CSI samples.

In some examples, to avoid triggering of the object detection by high-frequency cyclical movements (e.g., rotating fan blades), computing system 40 may filter out high-frequency bands from the frequency domain of the CSI samples and analyze lower-frequency bands of the frequency domain of the CSI samples. Computing system 40 may identify differences in one or more frequency bands of the frequency domain information. In some examples, Computing system 40 processes each CSI value sequence using an FFT algorithm resulting in multiple sub-band components of the input CSI samples. For example, computing system 40 may receive a time-series of CSI samples and generate 1024 frequency bands of the input CSI samples. As explained above, in some examples, the outputs of the FFT which correspond to the high frequency components may be ignored and only the sub-bands corresponding to the low frequencies may be analyzed. In some examples, a modified FFT algorithm may be used which reduces the computation complexity by not calculating the higher frequency sub-bands.

In some examples, computing system 40 processes CSI samples on a rolling basis. For example, each time wireless access point 8B generates a new CSI sample, computing system 40 may calculate a new set of Euclidean similarities based on a sequence of most recent CSI samples (e.g., a sequence of the 150 CSI samples most recently generated). Computing system 40 may input the set of similarity values to a machine learning model. In some examples, the machine learning model comprises a supervised machine learning model. Computing system 40 may train the machine learning model based on sets of similarity values associated with tags (annotated data) indicative of one or more conditions (e.g., whether a moving person was present or absent in the Wi-Fi coverage area). After the machine learning model is trained, computing system 40 may execute the machine learning model in real time or near-real time to determine a presence or absence of a characteristic (e.g., a moving person or another moving object) in the space between access points. The performance of the machine learning model may be tested using an extended set of annotated data.

Figure 2:
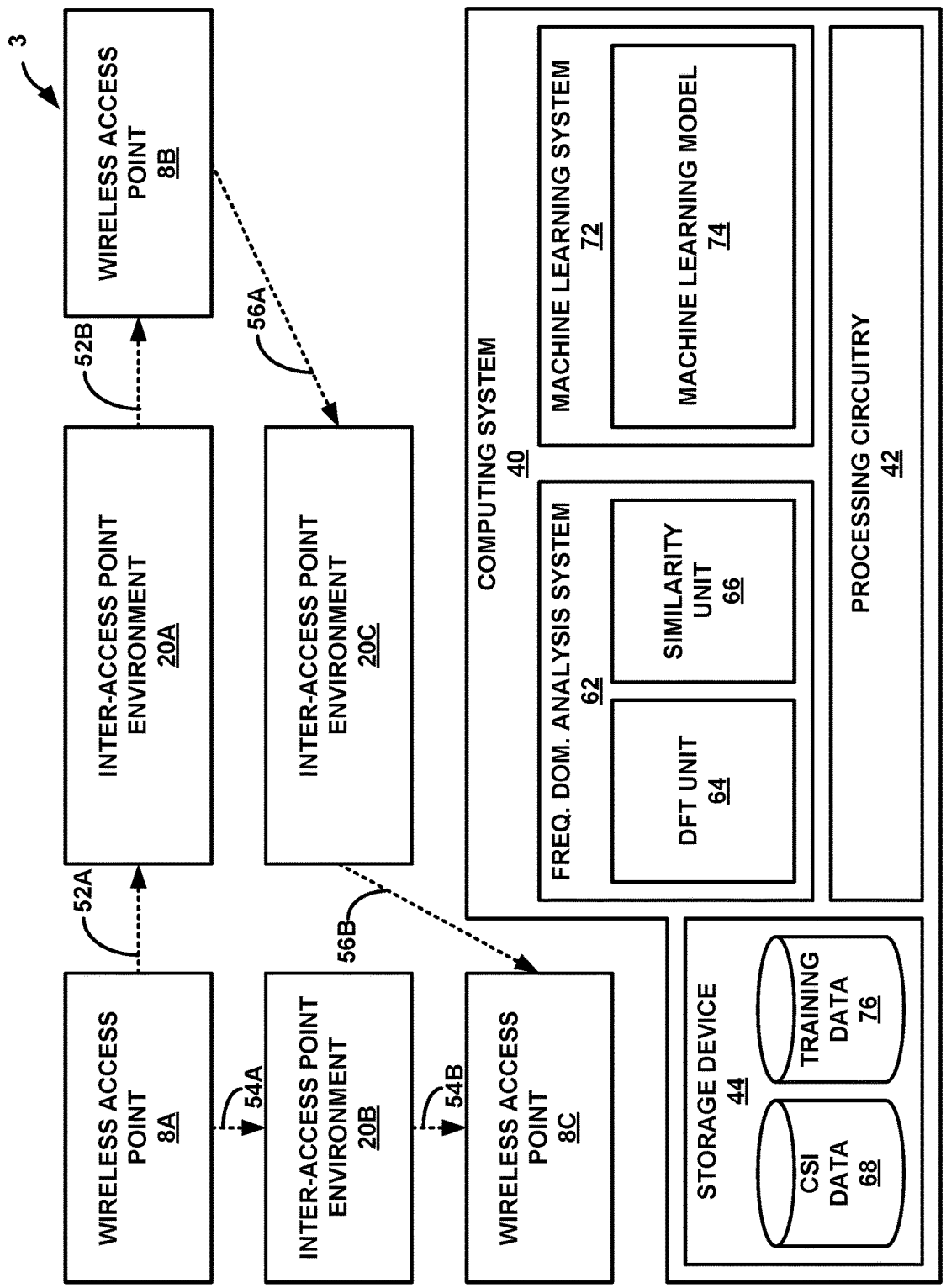
FIG. 2 is a block diagram illustrating an example access point system that determines characteristics of one or more inter-access point environments based on one or more detected CSI samples, in accordance with one or more techniques of this disclosure.

FIG. 2 is a block diagram illustrating an example access point system 3 that determines characteristics of one or more inter-access point environments based on one or more detected CSI samples, in accordance with one or more techniques of this disclosure. Access point system 3 may include one or more parts of network system 2 of FIG. 1. As seen in FIG. 2, access point system 3 includes wireless access points 8A-8C, and inter-access point environments 20A-20C. Inter-access point environment 20A is located between wireless access point 8A and wireless access point 8B. Inter-access point environment 20B is located between wireless access point 8A and wireless access point 8C. Inter-access point environment 20C is located between wireless access point 8B and wireless access point 8C.

Additionally, access point system 3 includes computing system 40. Computing system 40 includes processing circuitry 42, storage device 44, frequency domain analysis system 62, and machine learning system 72. Frequency domain analysis system 62 includes DFT unit 64 and similarity unit 66. Storage device 44 may store CSI data 68, which includes data input to and generated by frequency domain analysis system 62. Machine learning system 72 includes machine learning model 74. Storage device 44 may store training data 76. Machine learning system 72 may use training data to train machine learning model 74. In some examples, machine learning system 72 may perform supervised machine learning.

Computing system 40 may analyze one or more CSI samples corresponding to communication channels between access points 8, in order to determine characteristics of inter-access point environments between the access points. For example, wireless access point 8A may transmit signals 52A, and wireless access point 8B may receive signals 52B. In this example, wireless access point 8A may represent a "transmitter" of signals, and wireless access point 8B may represent a "receiver" of signals, but this is not required. In some examples, wireless access point 8B may transmit signals and wireless access point 8A may receive signals.

Inter-access point environment 20A may alter the sequence of signals 52A to the signals 52B as the signals traverse inter-access point environment 20A to wireless access point 8B. That is, the signals 52B received by wireless access point 8B may be different than the signals 52A originally transmitted by wireless access point 8A, and these differences may be induced by inter-access point environment 20A.

Inter-access point environment 20A may comprise everything within a space between wireless access point 8A and wireless access point 8B. For example, inter-access point environment 20A may include air, people, objects, pets, or any other items or matter located within the space between wireless access point 8A and wireless access point 8B. Contents of the inter-access point environment 20A may influence an alteration of the signals 52A to the signals 52B. For example, inter-access point environment 20A may cause signal scattering, signal fading, and power decay. In some examples, movements of one or more objects or people within the inter-access point environment may alter one or more signals travelling from wireless access point 8A to wireless access point 8B.

A sequence of CSI samples may comprise a set of CSI value sequences. Each CSI sample may include a set of CSI values, where each CSI value of the set of CSI values corresponds to a respective CSI value sequence of the set of CSI value sequences. Wireless access point 8A may transmit signals 52A, and wireless access point 8B may receive signals 52B. Wireless access point 8B may generate CSI samples at a frequency based on the signals 52B received from wireless access point 8A. For example, wireless access point 8B may generate one CSI sample of the sequence of CSI samples every time interval (e.g., every 10 ms or every 20 ms). Movements within the inter-access point environment 20A may affect some CSI value sequences of the set of CSI value sequences more than the movements affect other CSI value sequences of the set of CSI value sequences. This means that movements within inter-access point environment 20A may cause some of the CSI value sequences in the sequence of CSI samples generated by wireless access point 8B to be different than other CSI value sequences in the sequence of CSI samples.

Computing system 40 may analyze the sequence of CSI samples generated by wireless access point 8B in order to determine one or more characteristics of inter-access point environment 20A. For example, DFT unit 64 of frequency domain analysis system 62 may compute a set of DFTs. DFT unit may compute a DFT of the set of DFTs based on each CSI value sequence of the set of CSI value sequences in the sequence of CSI samples. Since each CSI value sequence includes a sequence of CSI values received by wireless access point 8B over a period of time, each CSI value sequence represents a time domain function of CSI values. In some examples, to compute a DFT based on a CSI value sequence of the sequence of CSI samples, DFT unit may execute an FFT algorithm in order to transform the time domain function of CSI values into a frequency domain function of DFT values.

A DFT computed by DFT unit 64 for a CSI value sequence may include a plurality of DFT values, where each DFT value of the plurality of DFT values indicates a parameter of a respective frequency band of a plurality of frequency bands. As such, a DFT may indicate a relative strength of frequency components within the respective CSI value sequence. In some examples, the set of DFTs computed for the set of CSI value sequence may be substantially the same when conditions within inter-access point environment 20A are static during the period of time when wireless access point 8B generates the sequence CSI samples based on signals travelling from wireless access point 8A to wireless access point 8B. In some examples, when one or more conditions within inter-access point environment 20A are fluid (e.g., changing) during the period of time when the sequence CSI samples travel from wireless access point 8A to wireless access point 8B, one or more DFTs of the set of DFTs may be substantially different from other DFTs of the set of DFTs.

Similarity unit 66 may analyze the set of DFTs computed by DFT unit. Each DFT may include a DFT value for each frequency band of the plurality of frequency bands. Similarity unit 66 may select a set of frequency bands of the plurality of frequency band and truncate the DFTs so that each DFT of the set of DFTs includes a set of DFT values each corresponding to a frequency band of the selected set of frequency bands and excludes sets of DFT values corresponding to frequency bands that are not selected. In some examples, similarity unit 66 may select the set of frequency bands to include the lowest 20% of the plurality of frequency bands. In some cases, DFT values for lower frequency bands may be affected by changing characteristics of inter-access point environment 20A more than DFT values for higher frequency bands.

In some examples, similarity unit 66 may compute a set of similarity values. For example, similarity unit 66 may compute a similarity value of the set of similarity values for each frequency band of the selected set of frequency bands. A similarity value may represent a similarity measure of the set of DFT values corresponding to the respective frequency band. Each similarity value of the set of similarity values may include any one or combination of Euclidean similarities, cosine similarities, Minkowski similarities, and Jaccard similarities. Other similarity values may be used in various implementations. A similarity value may indicate whether a set of DFT values are substantially the same, or whether one or more DFT values or the set of DFT values are different than one or more other DFT values in the same set of DFT values.

Machine learning system 72 may determine, based on the computed set of similarity values, information indicative of one or more characteristics the inter-access point environment 20A. For example, processing circuitry 42 may execute machine learning model 74 to generate the information, where the set of similarity values are inputs to the machine learning model 74. In some examples, the information indicative of one or more characteristics of the inter-access point environment 20A comprises information indicative of whether movement is present in the inter-access point environment 20A during a period of time when corresponding to the sequence of CSI samples. In some examples, the information indicative of one or more characteristics of the inter-access point environment 20A comprises information indicative of an identity of one or more objects or persons moving in the inter-access point environment 20A during the period of time when the sequence of CSI samples travel from wireless access point 8A to wireless access point 8B. In some examples, the information indicative of one or more characteristics of the inter-access point environment 20A comprises information indicative of a location of one or more objects or persons moving in the inter-access point environment 20A during the period of time corresponding to the sequence of CSI samples. The information is not limited to these examples. Machine learning model 74 may output many types of information corresponding to the inter-access point environment 20A.

In some examples, machine learning system 72 may train machine learning model 74 using training data 76. In some examples, the training data 76 may include one or more sets of similarity values and one or more associated sets of known characteristics. For example, the training data 76 may include a first set of similarity values associated with a first set of known characteristics, a second set of similarity values associated with a second set of known characteristics, and so on. By training machine learning model 74, machine learning system 72 may facilitate machine learning model 74 in outputting information indicative of one or more characteristics of the inter-access point environment 20A.

In some examples, wireless access point 8A may transmit signals 52A, and wireless access point 8B may receive a signals 52B, causing wireless access point 8B to generate a sequence of CSI samples based on signals 52B. Additionally, or alternatively, wireless access point 8A may transmit signals 54A, and wireless access point 8C may receive signals 54B, causing wireless access point 8C to generate a sequence of CSI samples based on signals 54B. Additionally, or alternatively, wireless access point 8B may transmit signals 56A, and wireless access point 8C may receive signals 56B, causing wireless access point 8C to generate a sequence of CSI samples based on signals 56B. The access point system 3 of FIG. 2 is not intended to be limited to three wireless access points. The techniques described herein may be applied in systems that include less than three access points and systems that include more than three access points.

Computing system 40 may determine information indicative of one or more characteristics of inter-access point environment 20A based on the sequence of CSI samples generated by wireless access point 8B based on the signals 52B. Computing system 40 may determine information indicative of one or more characteristics of inter-access point environment 20B based on the sequence of CSI samples generated by wireless access point 8C based on the signals 54B. Computing system 40 may determine information indicative of one or more characteristics of inter-access point environment 20C based on the sequence of CSI samples generated by wireless access point 8C based on the signals 56B. In some examples, computing system 40 may combine the information indicative of one or more characteristics of inter-access point environment 20A, the information indicative of one or more characteristics of inter-access point environment 20B, and the information indicative of one or more characteristics of inter-access point environment 20C in order to determine characteristics of a broader space in which wireless access points 8 are located. In some examples, inter-access point environment 20A, inter-access point environment 20B, and inter-access point environment 20C may overlap, but this is not required.

Figure 3:
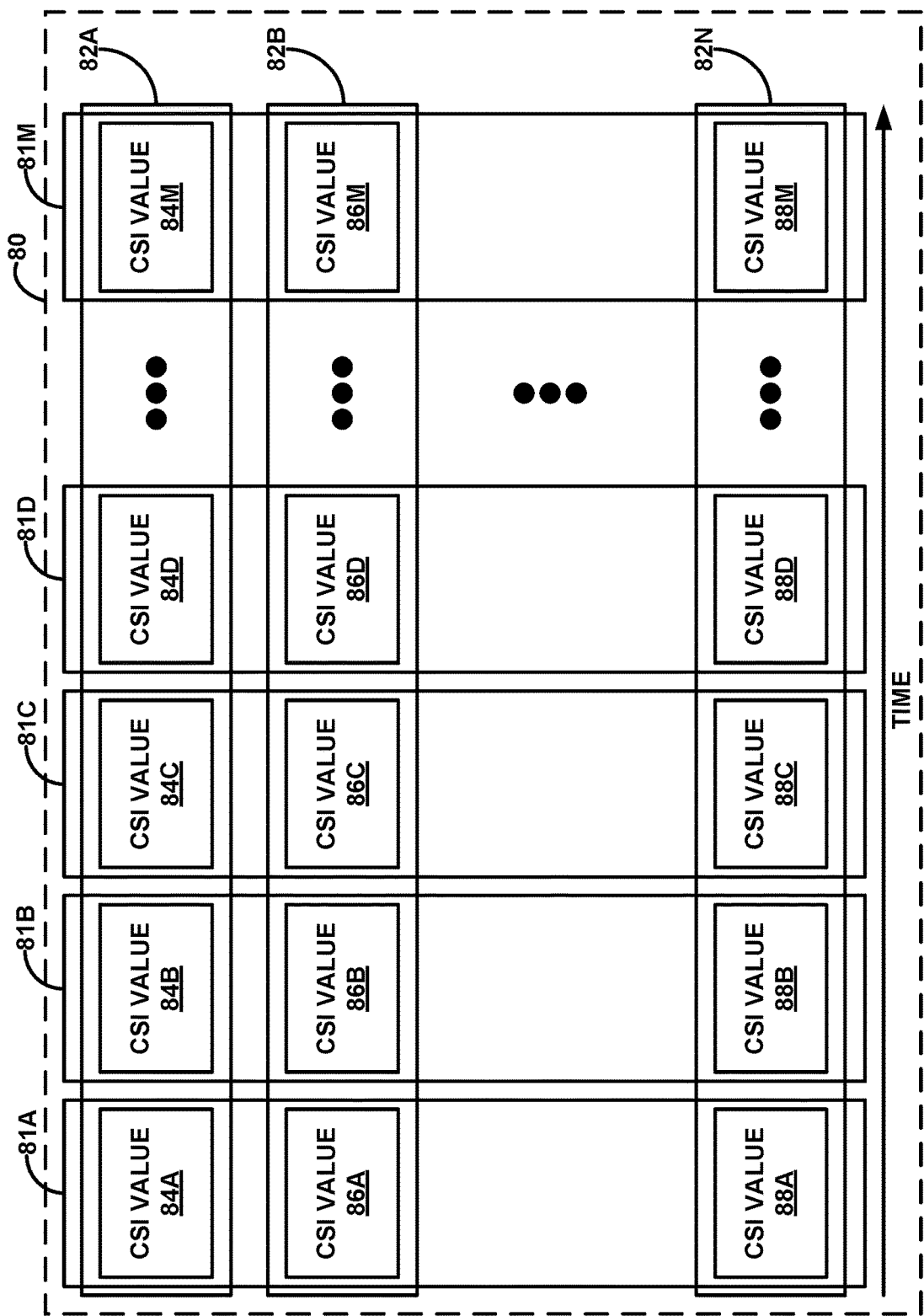
FIG. 3 is a block diagram illustrating a sequence of channel state information (CSI) samples, in accordance with one or more techniques of this disclosure.

FIG. 3 is a block diagram illustrating a sequence of CSI samples 80, in accordance with one or more techniques of this disclosure. In some examples, the sequence of CSI samples may be generated by any of wireless access points 8. For example, wireless access point 8B may generate the sequence of CSI samples 80 based on signals (e.g., Wi-Fi signals) received from wireless access point 8A. In some examples, inter-access point environment 20A may alter signals before the signals arrive at wireless access point 8B.

As seen in FIG. 3, the sequence of CSI samples 80 may include CSI samples 81A-81M (collectively, "CSI samples 81"). Wireless access point 8B may generate CSI samples 81 over a period of time at a frequency. In one example, wireless access point 8B may generate CSI samples 81 at a frequency of 100 Hertz (Hz). At a frequency of 100 Hz, wireless access point 8B may generate a CSI sample of CSI samples 81 every 10 milliseconds (ms). That is, wireless access point 8B may generate CSI sample 81A, and 10 ms later wireless access point 8B may generate CSI sample 81B, and 10 ms later wireless access point 8B may generate CSI sample 81C, and so on. As such, CSI samples 81 represent the sequence of CSI samples 80, where each CSI sample of the sequence of CSI samples 80 is spaced from neighboring CSI samples by the same window of time. This disclosure is not meant to be limited to wireless access points generating CSI samples at 100 Hz. Wireless access points 8 may generate CSI samples at any frequency or range of frequencies. The sequence of CSI samples 80 may include any number of CSI samples. In one example, CSI samples 81 may include 150 CSI samples, and CSI sample 81M is the 150*t* h CSI sample of the sequence of CSI samples 80 generated by wireless access point 8B.

The sequence of CSI samples 80 may include a set of CSI value sequences 82A-82N (collectively, "CSI value sequences 82"). For example, CSI value sequence 82A may include a sequence of CSI values 84A-84M (collectively, "sequence of CSI values 84"), CSI value sequence 82B may include a sequence of CSI values 86A-86M (collectively, "sequence of CSI values 86"), and CSI value sequence 82N may include a sequence of CSI values 88A-88M (collectively, "sequence of CSI values 88"). In one example, the set of CSI value sequences 82A-82N may include 56 CSI value sequences and the CSI value sequence 82N represents the $56^{th}$ CSI value sequence of the set of CSI value sequences 82A-82N, but this is not required. The set of CSI value sequences 82A-82N may include any number of CSI value sequences. In some examples, each CSI value sequence of the set of CSI value sequences 84 may include a sequence of CSI values of the same type, where each CSI value of the sequence of CSI value is generated at a different time.

In some examples, each CSI value sequence of the set of CSI value sequences 82 may include a CSI value from each of the CSI samples 81 in the sequence of CSI samples 80. For example, CSI value sequence 82A includes CSI value 84A from CSI sample 81A, CSI value 84B from CSI sample 81B, CSI value 84C from CSI sample 81C, and so on. Furthermore, each of CSI samples 81 comprises a CSI value from each CSI value sequence of the set of CSI value sequences 82. For example, CSI sample 81A may include CSI value 84A from CSI value sequence 82A, CSI value 86A from CSI value sequence 82B, CSI value 88A from CSI value sequence 82N, and a CSI value for each other CSI value sequence of the set of CSI value sequences 82. When the set of CSI value sequences 82A-82N include 56 CSI value sequences, each CSI sample of CSI samples 81 may include 56 CSI samples. When the set of CSI value sequences 82A-82N include n CSI value sequences, each CSI sample of CSI samples 81 may include n CSI samples.

Each CSI value (e.g., each of CSI values 84, CSI values 86, and CSI values 88) in the sequence of CSI samples 80 may represent a complex number having a real component and an imaginary component. An example CSI value may be expressed in the form a+ib, where a is a real number, b is a real number, and i is an imaginary unit. In other words, a is the real component of the complex number and ib is the imaginary component of the complex number. A magnitude of the complex number may be calculated as magnitude= $\sqrt{a^2+b^2}$.

Figure 4:
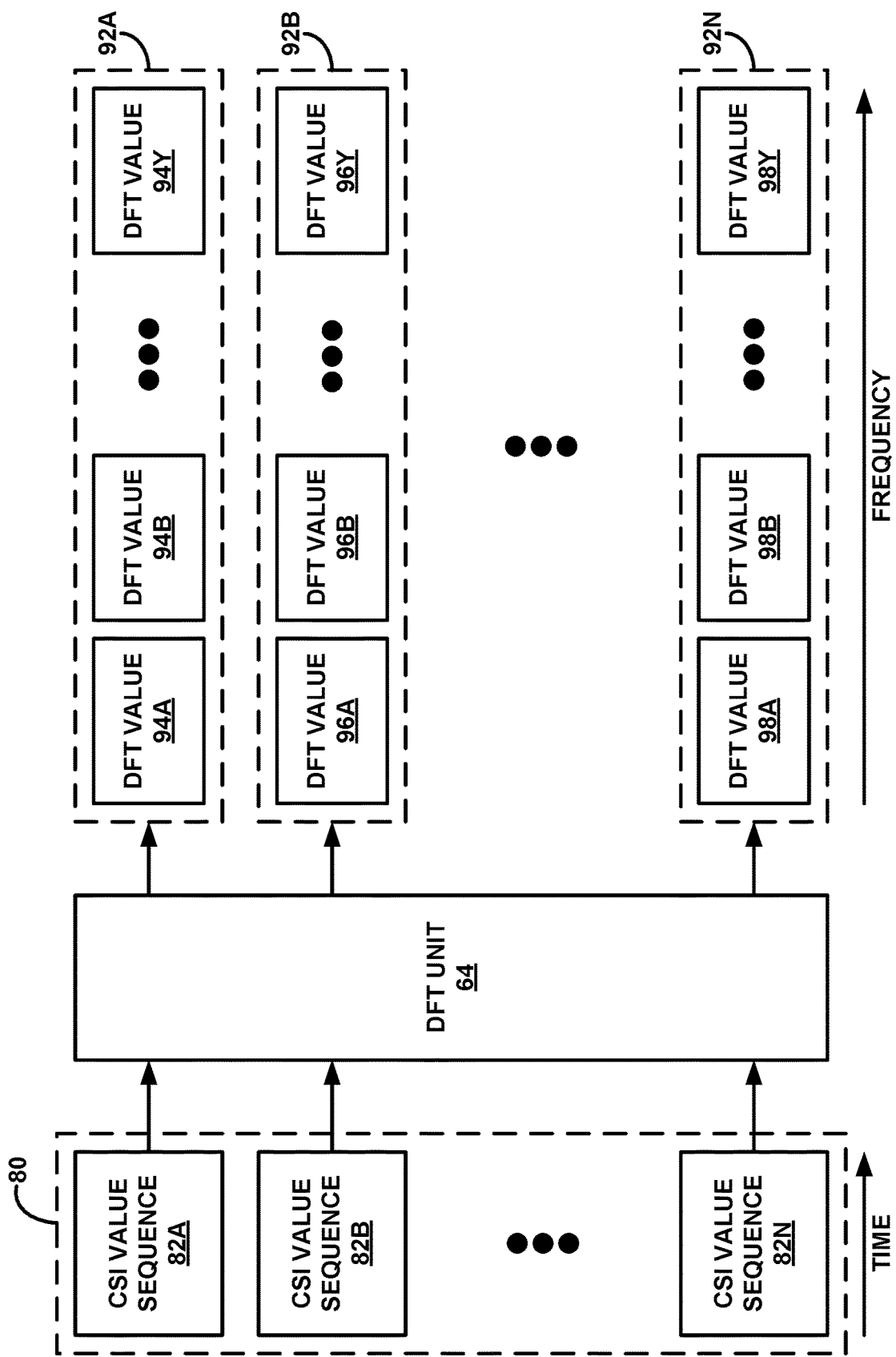
FIG. 4 is a block diagram illustrating a discrete Fourier transform (DFT) unit transforming a time domain sequence of CSI samples into frequency domain information, in accordance with one or more techniques of this disclosure.

FIG. 4 is a block diagram illustrating DFT unit 64 transforming the time domain sequence of CSI samples 80 into frequency domain information, in accordance with one or more techniques of this disclosure. As seen in FIG. 4, DFT unit 64 of computing system 40 may receive the sequence of CSI samples 80 including CSI value sequences 82, and DFT unit 64 may output a set of DFTs 92A-92N (collectively, "DFTs 92").

In some examples, DFT unit 64 may transform the CSI value sequences 82, which are in the time domain, into the DFTs 92, which are in the frequency domain. Each DFT of the set of DFTs 92 may include a respective set of DFT values. For example, DFT 92A includes a set of DFT values 94A-94Y (collectively, "DFT values 94"), DFT 92B includes a set of DFT values 96A-96Y (collectively, "DFT values 96"), and DFT 92N includes a set of DFT values 98A-98Y (collectively, "DFT values 98"). DFT unit 64 may output a DFT of DFTs 92 for each CSI value sequence of CSI value sequences 82. For example, DFT 92A is a frequency domain representation of CSI value sequence 82A, DFT 92B is a frequency domain representation of CSI value sequence 82B, and DFT 92N is a frequency domain representation of CSI value sequence 82N.

In some examples, DFT unit 64 may execute one or more FFT algorithms in order to calculate DFTs 92. In one example, DFT unit 64 may execute the Cooley-Tuckey FFT algorithm in order to generate the DFTs 92, but this is not required. DFT unit 64 may execute any algorithm capable of transforming the time domain CSI value sequences into the frequency domain DFTs. In some examples, DFT unit 64 may use one or more window functions to calculate DFTs 92. In some examples, DFT unit 64 may generate each DFT of DFTs 92 to include a DFT value for each frequency band of a plurality of frequency bands. For example, DFT 92A may include DFT values 94 that indicate a frequency domain representation of CSI value sequence 82A, where DFT value 94A indicates a parameter of a $1^{st}$ frequency band of the plurality of frequency bands in CSI value sequence 82A, DFT value 94B indicates a parameter of a $2^{nd}$ frequency band of the plurality of frequency bands in CSI value sequence 82A, and DFT value 94Y indicates a parameter of a $y^{th}$ frequency band of the plurality of frequency bands in CSI value sequence 82A. In other words, the plurality of frequency bands may include a number y frequency bands, and each DFT calculated by DFT unit 64 may include a DFT value for each of they frequency bands.

In some examples, each DFT of DFT's 92 may comprise a power spectral density (PSD) function that plots energy distribution against frequency. For example, each DFT value of a set of DFT values may correspond to a respective frequency band of a plurality of frequency bands, and each DFT value of the set of DFT values may indicate a power density of the frequency band corresponding to the DFT value.

In some examples, DFT values 94A, 96A, and 98A may correspond to the lowest frequency band of the plurality of frequency bands, and DFT values 94Y, 96Y, and 98Y may correspond to the greatest frequency band of the plurality of frequency bands. The frequency bands may increase in size from A to Y.

Figure 5:
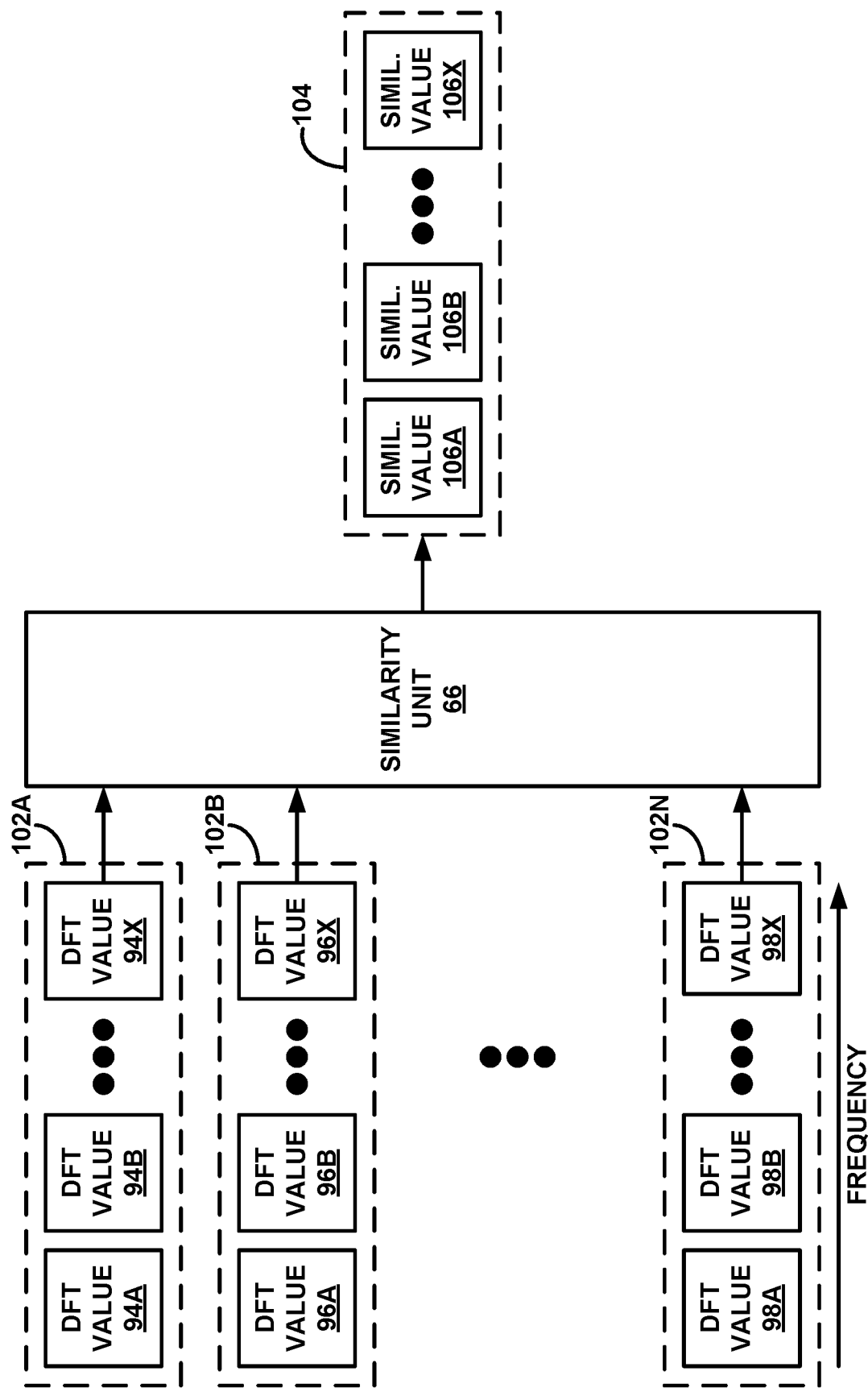
FIG. 5 is a block diagram illustrating similarity unit receiving sets of DFT values and outputting similarity measures, in accordance with one or more techniques of this disclosure.

FIG. 5 is a block diagram illustrating similarity unit 66 receiving sets of DFT values and outputting similarity measures, in accordance with one or more techniques of this disclosure. As seen in FIG. 5, Similarity unit 66 may receive sets of DFT values 102A-102N (collectively, "sets of DFT values 102"). Similarity unit 66 may generate a set of similarity values 104. The set of similarity values 104 may include similarity values 106A-106X (collectively, "similarity values 106").

In some examples, similarity unit 66 may generate a similarity value of similarity values 106 for each frequency band of a set of frequency bands. For example, similarity unit 66 may generate the similarity value 106A based on the DFT values 94A-98A corresponding to a first frequency band of the set of frequency bands, generate the similarity value 106B based on the DFT values 94B-98B corresponding to a second frequency band of the set of frequency bands, and so on. In some examples, similarity unit 66 may receive a number n sets of DFT values 102, where each set of DFT values may include a number x DFT samples. In some examples, each set of DFT values of the sets of DFT values 102 may correspond to a respective value sequence of the set of CSI value sequences 82.

In some examples, frequency domain analysis system 62 may select the sets of DFT values 102A from the DFTs 92. As described above, each DFT of DFTs 92 includes a plurality of y DFT values, where each DFT value of the plurality of y DFT values corresponds to a respective frequency band of a plurality of y frequency bands. The plurality of y frequency bands may range from a lowest frequency band to a highest frequency band. It may be beneficial for computing system 40 to analyze DFT values corresponding to lower frequency bands of the plurality of frequency bands, Frequency domain analysis system 62 may select a set of x frequency bands of the plurality of y frequency bands. Frequency domain analysis system 62 may truncate the DFTs 92 to include DFT values corresponding to the selected set of x frequency bands. For example, the set of DFT values 102A may include DFT values 94A-94X, which is truncated from the plurality of DFT values 94A-94Y included in DFT 92.

Similarity unit 66 may calculate a similarity value of similarity values 106 for each frequency band of the selected set of x frequency bands. In some examples, each similarity value of similarity values 106 may represent a similarity measure of the DFT values for the respective frequency band of the selected set of x frequency bands. For example, similarity value 106A may represent a similarity measure for the set of DFT values 94A-98A, similarity value 106B may represent a similarity measure for the set of DFT values 94B-98B, and similarity value 106X may represent a similarity measure for the set of DFT values 94X-98X.

Similarity unit 66 may calculate the similarity values 106 based on one or more similarity measure algorithms. These similarity measure algorithms may include any one or combination of Euclidean similarity algorithms, cosine similarity algorithms, Minkowski similarity algorithms, Jaccard similarity algorithms, or any other similarity measure. In one example, similarity unit 66 may calculate similarity values 106 using the Euclidian similarity algorithm. The following equation represents one example of the Euclidean similarity algorithm.

$$\text{Euclidean Similarity} = \frac{1}{\text{mean}(x)^2} \sum_{i=1}^{n-1} \sum_{j=i+1}^{n} (x_i - x_j)^2 \quad \text{(eq. 1)}$$

In the above algorithm, $x_i$ may represent a DFT value of a set of DFT values, and $x_j$ may represent an adjacent DFT value of the set of DFT values. In this way, the Euclidean similarity equation may calculate a sum of the square of differences between pairs of DFT value of a set of DFT values, and divide by the mean DFT value squared. In this way, the Euclidean similarity value may be greater if there are more pairs of DFT values that are different as compared with examples where each DFT value is substantially the same.

In some examples, similarity unit 66 may normalize one or more Euclidean similarity values calculated by similarity unit 66. For example, similarity unit 66 may normalize one or more similarity values of a training data set based on a minimum similarity value of the training data set and a maximum similarity value of the training data set. Similarity unit 66 may execute the following equation to calculate a normalized similarity value.

$$\text{Normalized Similarity}_i = \frac{\text{Similarity}_i - \text{Min(Similarity)}}{\text{Max(Similarity)} - \text{Min(Similarity)}} \quad \text{(eq. 2)}$$

When the characteristics of the inter-access point environment 20A are static during the period of time in which the sequence of CSI samples 80 arrive at wireless access point 8B, then the DFT values corresponding to any frequency band of the selected set of frequency bands may be substantially similar. When one or more characteristics of the inter-access point environment 20A are changing during the period of time in which the sequence of CSI samples 80 arrive at wireless access point 8B, then some DFT values corresponding to a frequency band may be different than other DFT values corresponding to the same frequency band. By calculating the similarity values 106, similarity unit 66 may identify whether any frequency bands have differing DFT values. Machine learning model 74 may receive these similarity values 106, and output information indicative of one or more characteristics of the inter-access point environment 20A.

In one example, the set of DFT values 94A-98A may include one DFT value corresponding to each CSI value sequence of the set of CSI value sequences. When each DFT value of the set of DFT values 94A-98A is substantially the same as each other DFT value of the set of DFT values 94A-98A, then similarity value 106A may indicate a high level of similarity between the set of DFT values 94A-98A. When each DFT value of the set of DFT values 94A-98A is substantially different than one or more other DFT values of the set of DFT values 94A-98A, then similarity value 106A may indicate a lower level of similarity between the set of DFT values 94A-98A as compared with an example where the set of DFT values 94A-98A are substantially the same. Since each similarity value of similarity values 106 indicates a similarity measure of DFTs corresponding to a respective frequency band of a set of frequency bands, similarity values 106 may indicate one or more frequency bands of the CSI value sequence affected by the inter-access point environment 20A. A machine learning model, such as machine learning model 74, may process the similarity values 106 in order to identify information indicative of one or more characteristics of the inter-access point environment 20A.

Figure 6:
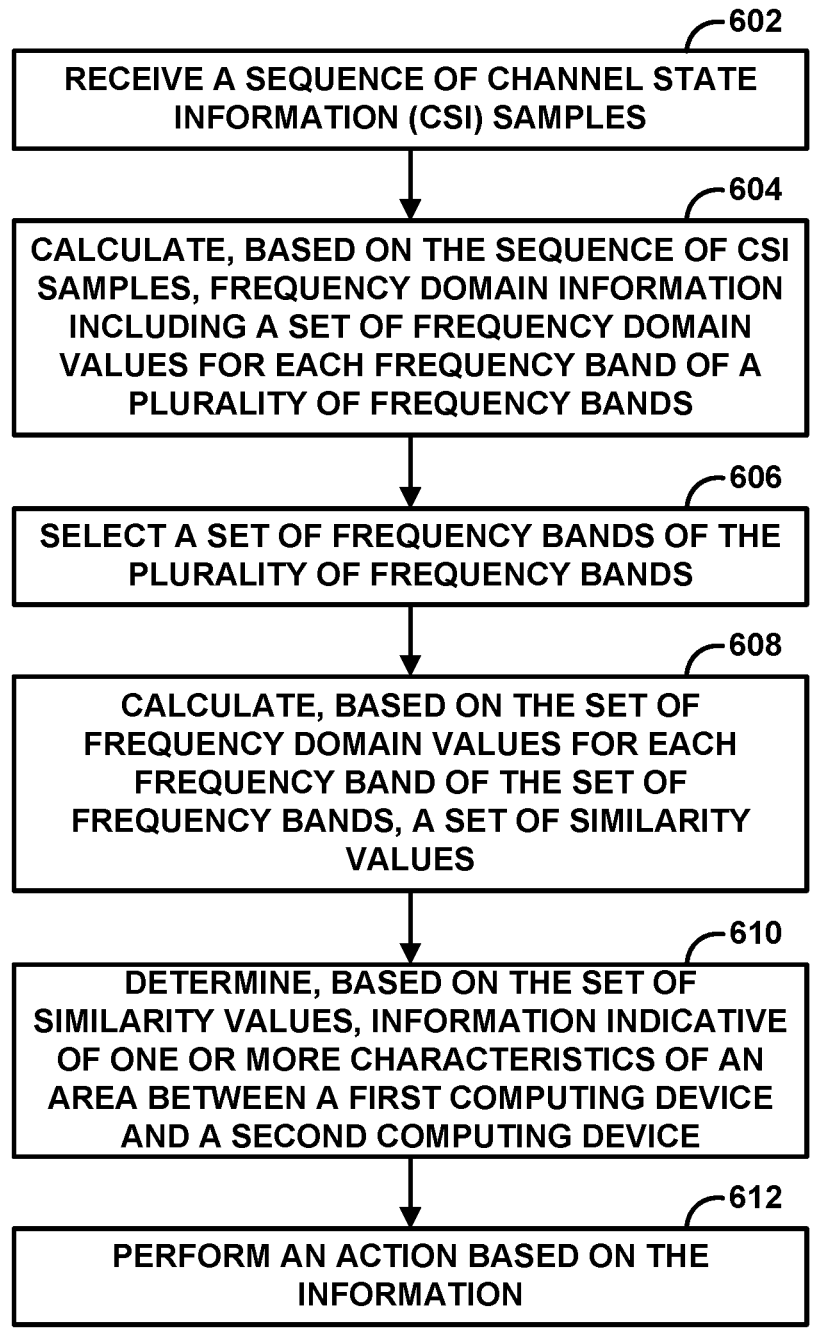
FIG. 6 is a flow diagram illustrating an example operation for processing CSI information in order to determine information indicative of one or more characteristics of a space between two computing devices, in accordance with one or more techniques of this disclosure.

FIG. 6 is a flow diagram illustrating an example operation for processing CSI information in order to determine information indicative of one or more characteristics of a space between two computing devices, in accordance with one or more techniques of this disclosure. For convenience, FIG. 6 is described with respect to wireless access points 8 and computing system 40 of FIGS. 1-5. However, the techniques of FIG. 6 may be performed by different components of wireless access points 8 and computing system 40 or by additional or alternative devices.

Computing system 40 may receive a sequence of CSI samples (602). In some examples, the sequence of CSI samples may represent a sequence of CSI samples received by a wireless access point (e.g., wireless access point 8B) from another wireless access point (e.g., wireless access point 8A). For example, wireless access point 8A may send a signals 52A and wireless access point 8B may receive a signals 52B. Inter-access point environment 20A may alter the signals 52A to the signals 52B. Wireless access point 8B may generate a sequence of CSI samples based on the signals 52B. Computing system 40 may receive the sequence of CSI samples for analysis.

DFT unit 64 may calculate, based on the sequence of CSI samples, frequency domain information including a set of frequency domain values for each frequency band of a plurality of frequency bands (604). In some examples, DFT unit 64 may execute one or more FFT algorithms in order to calculate the frequency domain information. Computing system 40 may select a set of frequency bands of the plurality of frequency bands (606). In some examples, similarity unit 66 may select the set of frequency bands.

Similarity unit 66 may calculate, based on the set of frequency domain values for each frequency band of the set of frequency bands, a set of similarity values (608). In some examples, similarity unit 66 may calculate the set of similarity values using one or more similarity measures. These similarity measures may indicate whether one or more frequency domain values corresponding to a frequency band are different from one or more other frequency domain values corresponding to the same frequency band. Machine learning system 72 may execute machine learning model 74 in order to determine, based on the set of similarity values, information indicative of one or more characteristics of a space between wireless access point 8A and wireless access point 8B (610). Computing system 40 may perform an action based on the information (612). For example, computing system 40 may store the information, output one or more control signals based on the information, configure one or more devices based on the information, or any combination thereof.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively, or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A computing system comprising:
   a storage device; and
   processing circuitry having access to the storage device and configured to:
     receive a sequence of channel state information (CSI) samples, wherein the sequence of CSI samples correspond to a communication channel between a first computing device and a second computing device;
     calculate, based on the sequence of CSI samples, frequency domain information including a set of frequency domain values for each frequency band of a plurality of frequency bands;
     select a set of frequency bands of the plurality of frequency bands;
     calculate, based on the set of frequency domain values for each frequency band of the set of frequency bands, a set of similarity values, wherein each similarity value of the set of similarity values corresponds to the set of frequency domain values for the respective frequency band of the set of frequency bands;
     determine, based on the set of similarity values, information indicative of one or more characteristics of a space between the first computing device and the second computing device; and
     perform an action based on the information.

2. The computing system of claim 1,
   wherein to receive the sequence of CSI samples, the processing circuitry is configured to receive a sequence of sets of CSI values, wherein each set of CSI values of the sequence of sets of CSI values corresponds to a respective CSI sample of the sequence of CSI samples, wherein the sequence of sets of CSI values correspond to a set of CSI value sequences,
   wherein to calculate the frequency domain information, the processing circuitry is configured to compute a set of discrete Fourier transforms (DFTs) each corresponding to a respective CSI value sequence of the set of CSI value sequences, wherein each DFT of the set of DFTs includes a plurality of DFT values each indicating a parameter of a respective frequency band of a plurality of frequency bands, and
   wherein the processing circuitry is configured to calculate the set of similarity values based on a set of DFT values for each frequency band of the set of frequency bands.

3. The computing system of claim 2, wherein the sequence of sets of CSI values include one or more complex numbers each including an amplitude value and a phase value.

4. The computing system of claim 2, wherein to calculate the set of similarity values, the processing circuitry is configured to:
   identify a matrix of DFT values comprising a set of rows and a set of columns, wherein each row of the set of rows includes a row set of DFT values corresponding to a respective DFT of the set of DFTs, and wherein each column of the set of columns includes a column set of DFT values corresponding to a respective frequency band of the set of frequency bands; and compute, for each frequency band of the set of frequency bands, a similarity value of the set of similarity values based on the column set of DFT values in the respective column of the set of columns.

5. The computing system of claim 4, wherein to compute each similarity value of the set of similarity values, the processing circuitry is configured to compute a similarity measure that quantifies a similarity between the one or more DFT values for the respective frequency band of the set of frequency bands.

6. The computing system of claim 5, wherein the similarity measure represents any one or combination of a Euclidean Similarity, a cosine similarity, a Minkowski similarity, and a Jaccard similarity.

7. The computing system of claim 1, wherein to determine the information indicative of the one or more characteristics of the space between the first computing device and the second computing device, the processing circuitry is configured to:

execute a trained machine learning model, wherein the set of similarity values represent inputs to the machine learning model; and receive, as an output from the machine learning model, the information indicative of the one or more characteristics of the space between the first computing device and the second computing device.

8. The computing system of claim 7, wherein the information indicative of the one or more characteristics of the space between the first computing device and the second computing device comprises any one or combination of:

information indicative of whether movement is present in the space during a period of time corresponding to the sequence of CSI samples;

information indicative of an identity of one or more objects or persons moving in the space during the period of time corresponding to the sequence of CSI samples; and information indicative of a location of one or more objects or persons moving in the space during the period of time corresponding to the sequence of CSI samples.

9. The computing system of claim 1, wherein to select the set of frequency bands of the plurality of frequency bands, the processing circuitry is configured to select one or more frequency bands that are lower than a mean frequency of the plurality of frequency bands.

10. The computing system of claim 1, wherein to select the set of frequency bands of the plurality of frequency bands, the processing circuitry is configured to select the set of frequency bands to include the lowest 20% of frequencies in the plurality of frequency bands.

11. The computing system of claim 1, wherein the second computing device comprises the processing circuitry and the storage device, and wherein the second computing device is configured to receive, from the first computing device, each CSI sample of the sequence of CSI samples.

12. The computing system of claim 1, wherein the first computing device comprises a first Wi-Fi access point, and wherein the second computing device comprises a second Wi-fi Access Point.

13. A method comprising:

receiving, by processing circuitry having access to a storage device, a sequence of channel state information (CSI) samples, wherein the sequence of CSI samples correspond to a communication channel between a first computing device and a second computing device;

calculating, by the processing circuitry based on the sequence of CSI samples, frequency domain information including a set of frequency domain values for each frequency band of a plurality of frequency bands;

selecting, by the processing circuitry, a set of frequency bands of the plurality of frequency bands;

calculating, by the processing circuitry based on the set of frequency domain values for each frequency band of the set of frequency bands, a set of similarity values, wherein each similarity value of the set of similarity values corresponds to the set of frequency domain values for the respective frequency band of the set of frequency bands;

determining, by the processing circuitry based on the set of similarity values, information indicative of one or more characteristics of a space between the first computing device and the second computing device; and performing, by the processing circuitry, an action based on the information.

14. The method of claim 13, wherein receiving the sequence of CSI samples comprises receiving a sequence of sets of CSI values, wherein each set of CSI values of the sequence of sets of CSI values corresponds to a respective CSI sample of the sequence of CSI samples, wherein the sequence of sets of CSI values correspond to a set of CSI value sequences, wherein calculating the frequency domain information comprises computing a set of discrete Fourier transforms (DFTs) each corresponding to a respective CSI value sequence of the set of CSI value sequences, wherein each DFT of the set of DFTs includes a plurality of DFT values each indicating a parameter of a respective frequency band of a plurality of frequency bands, and wherein the method further comprises calculating the set of similarity values based on a set of DFT values for each frequency band of the set of frequency bands.

15. The method of claim 14, wherein calculating the set of similarity values comprises:

identifying a matrix of DFT values comprising a set of rows and a set of columns, wherein each row of the set of rows includes a row set of DFT values corresponding to a respective DFT of the set of DFTs, and wherein each column of the set of columns includes a column set of DFT values corresponding to a respective frequency band of the set of frequency bands; and computing, for each frequency band of the set of frequency bands, a similarity value of the set of similarity values based on the column set of DFT values in the respective column of the set of columns.

16. The method of claim 15, wherein computing each similarity value of the set of similarity values comprises computing a similarity measure that quantifies a similarity between the one or more DFT values for the respective frequency band of the set of frequency bands.

17. The method of claim 13, wherein determining the information indicative of the one or more characteristics of the space between the first computing device and the second computing device comprises:

executing a trained machine learning model, wherein the set of similarity values represent inputs to the machine learning model; and receiving, as an output from the machine learning model, the information indicative of the one or more characteristics of the space between the first computing device and the second computing device.

18. The method of claim 13, wherein selecting the set of frequency bands of the plurality of frequency bands comprises selecting one or more frequency bands that are lower than a mean frequency of the plurality of frequency bands.

19. The method of claim 13, wherein selecting the set of frequency bands of the plurality of frequency bands comprises selecting the set of frequency bands to include the lowest 20% of frequencies in the plurality of frequency bands.

20. A non-transitory computer-readable medium comprising instructions that, when executed by a processor, causes the processor to:
   receive a sequence of channel state information (CSI) samples, wherein the sequence of CSI samples correspond to a communication channel between a first computing device and a second computing device;
   calculate, based on the sequence of CSI samples, frequency domain information including a set of frequency domain values for each frequency band of a plurality of frequency bands;
   select a set of frequency bands of the plurality of frequency bands;
   calculate, based on the set of frequency domain values for each frequency band of the set of frequency bands, a set of similarity values, wherein each similarity value of the set of similarity values corresponds to the set of frequency domain values for the respective frequency band of the set of frequency bands;
   determine, based on the set of similarity values, information indicative of one or more characteristics of a space between the first computing device and the second computing device; and
   perform an action based on the information.

* * * * *